(12) United States Patent
Wong et al.

(10) Patent No.: US 8,112,012 B2
(45) Date of Patent: Feb. 7, 2012

(54) SYSTEM AND METHOD FOR CLEANING A PRINTER

(75) Inventors: Hin Loong Wong, Singapore (SG); Kai Leong Wong, Singapore (SG)

(73) Assignee: Dell Products L.P., Round Rock, TX (US)

(*) Notice: Subject to any disclaimer, the term of this patent is extended or adjusted under 35 U.S.C. 154(b) by 974 days.

(21) Appl. No.: 12/099,259

(22) Filed: Apr. 8, 2008

(65) Prior Publication Data

US 2009/0250080 A1 Oct. 8, 2009

(51) Int. Cl.
*G03G 21/00* (2006.01)

(52) U.S. Cl. ......... 399/98; 134/6; 101/425; 15/250.001; 15/250.15; 15/250.19

(58) Field of Classification Search ...... 134/6; 101/425; 399/98

See application file for complete search history.

(56) References Cited

U.S. PATENT DOCUMENTS

| | | | |
|---|---|---|---|
| 5,570,161 A | 10/1996 | Andrews et al. | |
| 5,689,769 A | 11/1997 | Appel et al. | |
| 6,119,299 A | 9/2000 | Lin | |
| 6,795,219 B2* | 9/2004 | Fujita | 358/496 |
| 7,203,444 B2* | 4/2007 | Yamazaki | 399/98 |
| 7,277,655 B2* | 10/2007 | Namba | 399/98 |
| 7,436,426 B2* | 10/2008 | Lim | 347/263 |
| 7,515,171 B2* | 4/2009 | Lim | 347/263 |
| 7,528,855 B2* | 5/2009 | Namba | 347/241 |
| 7,853,170 B2* | 12/2010 | Ueda et al. | 399/98 |
| 7,872,664 B2* | 1/2011 | Yamakawa et al. | 347/241 |
| 7,926,903 B2* | 4/2011 | Yokoyama et al. | 347/33 |
| 7,995,946 B2* | 8/2011 | Ueda et al. | 399/98 |
| 2005/0012973 A1* | 1/2005 | Sowa et al. | 359/198 |
| 2006/0171727 A1* | 8/2006 | Inui et al. | 399/27 |
| 2007/0182806 A1* | 8/2007 | Kobayashi | 347/158 |
| 2008/0205951 A1* | 8/2008 | Ueda et al. | 399/345 |
| 2009/0162117 A1* | 6/2009 | Yamada et al. | 399/343 |
| 2009/0245850 A1* | 10/2009 | Kawai et al. | 399/98 |
| 2010/0329727 A1* | 12/2010 | Ashida et al. | 399/98 |
| 2011/0286760 A1* | 11/2011 | Tidrick | 399/98 |
| 2011/0286761 A1* | 11/2011 | Ueda et al. | 399/98 |
| 2011/0292101 A1* | 12/2011 | Takeda et al. | 347/5 |

OTHER PUBLICATIONS http://www.office.xerox.com/userdoc/P7750/7750_Web/partslist/. xerox corporation. "Phaser 7750 Parts List Diagram." May 19, 2008, 43 pages.

* cited by examiner

*Primary Examiner* — David Gray
*Assistant Examiner* — Geoffrey Evans
(74) *Attorney, Agent, or Firm* — Hamilton & Terrile, LLP; Robert W. Holland

(57) ABSTRACT

A printer ROS window cleaning system enforces unidirectional cleaning motion through a passageway formed in the printer housing. A guide has a distal portion that engages a cleaning tool from insertion until a cleaning portion reaches the rear of the passageway. A cleaning tool deflector positioned at the rear of the passageway biases the cleaning tool from the distal portion of the passageway to a proximate portion so that the cleaning portion contacts the ROS window. A unidirectional cleaning feature ensures that the cleaning portion will contact the ROS window during removal of the cleaning tool by preventing re-insertion of the cleaning tool in the proximate portion of the passageway.

18 Claims, 9 Drawing Sheets

SYSTEM AND METHOD FOR CLEANING A PRINTER

BACKGROUND OF THE INVENTION

1. Field of the Invention

The present invention relates in general to the field of information handling system printers, and more particularly to a system and method for cleaning a printer.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generate large quantities of information in electronic form, which, in at least some instances, is transferred to a medium, typically paper, with a printing device. For example, a laser printer interfaces with an information handling system to accept electronic information, apply the electronic information to form a visual image on a drum with toner and a laser device, and transfer the electronic image to paper by heating the toner to fuse the image onto the paper. Typically, electronic components within the printer are kept separate from the printing process to prevent contamination of the electronic components. For instance, the laser forms an image on a drum for transfer to paper by illuminating the drum through a window, referred to as the ROS (raster output scanner) window. The laser forms the image with a raster or scan through the ROS window and across the drum that provides a horizontal series of dots onto the drum. In some instances, printed information is transferred to an electronic form with a scanning device. The scanner typically views the printed material through a window, often the same ROS window used by the laser, and translates the viewed image into electronic information.

Generally, in order to have a high quality print or scan of information, the ROS window must be clean from contaminants that block or distort light passing through the window. Efforts to maintain a clean ROS window face a number of difficulties. One difficulty is that a ROS window is typically located in a position that collects contamination, such as toner particles, paper and dust. The ROS window position often offers limited accessibility, such as through a narrow passageway that travels parallel to the path followed by the laser. Usually, the passageway provides access to a manual cleaning apparatus, such as a plastic shaft with a cleaning pad attached so that the ROS window can be manually cleaned if vertical streak lines appear in the printout, as often occurs when waste toner particles fall in the laser path. Manual cleaning of a ROS window is typically not very robust. For instance, in placing a cleaning stick with a cleaning pad in the ROS window passageway, foreign particles are often inadvertently added to the ROS window position, resulting in decreased clarity of printed and scanned images. Although instructions in a printer or scanner user manual may direct unidirectional cleaning motions towards the ROS window passageway exit, such instructions are often overlooked.

SUMMARY OF THE INVENTION

Therefore a need has arisen for a system and method which enforces desired cleaning motions for cleaning transparent surfaces of a printer or scanner.

In accordance with the present invention, a system and method are provided which substantially reduce the disadvantages and problems associated with previous methods and systems for cleaning transparent surfaces of a printer or scanner. A cleaning tool interacts with a cleaning passageway to prevent contact of a cleaning device and the transparent surface during insertion of the tool and to automatically bring the cleaning device and transparent surface in contact during removal of the cleaning tool so that cleaning of the transparent surface is performed with a unidirectional motion.

More specifically, a printer prints and or scans information through a transparent surface, such as a ROS window. A cleaning guide passageway formed in the printer housing along the transparent surface accepts a cleaning tool through an entry portion and directs the cleaning tool along a distal portion of a guide to the rear portion of the passageway. An exit flaps at the entry portion prevents insertion of the cleaning tool at the proximate portion of the guide so that a cleaning pad of the cleaning tool does not contact the transparent portion during insertion. A cleaning tool deflector at the rear portion of the cleaning guide passageway bias the cleaning tool from the distal portion of the guide to the proximate portion when the cleaning tool reaches the rear portion. During removal of the cleaning tool, the proximate portion of the guide maintains the cleaning pad in contact with the transparent surface. A unidirectional cleaning feature resists insertion of the cleaning tool into the passageway when in the proximate portion of the guide so that contact of the cleaning pad and transparent surface occurs during removal the cleaning tool to avoid pushing contaminants into the passageway during insertion of the cleaning tool.

The present invention provides a number of important technical advantages. One example of an important technical advantage is that a unidirectional cleaning motion is enforced during cleaning of a printer or scanner transparent surface. Contact of a cleaning device with a surface in need of cleaning is prevented until the cleaning device is properly inserted to a cleaning position within a cleaning passageway. Once contact is made between the cleaning device and surface to be cleaned, unidirectional motion of the cleaning device is enforced throughout a cleaning motion. Enforcement of unidirectional motion prevents inadvertent insertion of contaminants within the cleaning passageway. Interaction of the cleaning device and a unidirectional device during the cleaning motion give the end user feedback during the cleaning process. Further, contact between the cleaning device and surface in need of cleaning is prevented until a complete insertion of the cleaning device is made, thus preventing partial cleaning motions from partial insertion of the cleaning device.

BRIEF DESCRIPTION OF THE DRAWINGS

The present invention may be better understood, and its numerous objects, features and advantages made apparent to FIG. 1 depicts an information handling system interfaced with a printer having a ROS window cleaning guide housing.

DETAILED DESCRIPTION

Information from an information handling system sent to a printer for printing on a medium is printed with less distortion where a ROS window of the printer is cleaned by a unidirectional cleaning motion. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
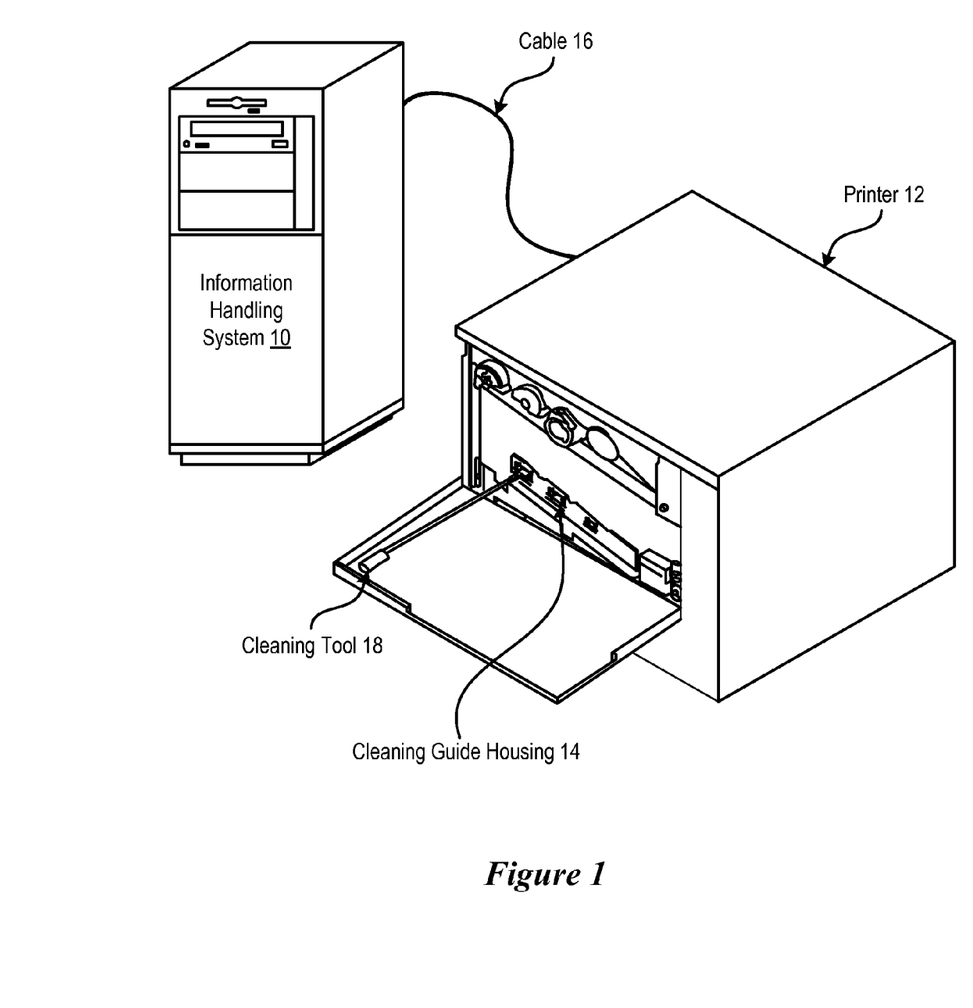

Referring now to FIG. 1, an information handling system 10 is depicted interfaced with a printer 12 having a ROS window cleaning guide housing 14. Information handling system has a plurality of processing components, such as a CPU, RAM, and a chipset, that cooperate to generate information, such as with an application running over an operating system. Information handling system 10 communicates information to printer 12 through a cable 16, such as a direct or networked cable interface, or through a wireless interface so that printer 12 can transfer the information to a print media, such as paper. Printer 12 is a laser printer which forms images with a series of horizontal scans across a rotating drum. Based upon illumination by the laser, a selectively charged drum attracts toner to paper to form visual images. The toner fuses to the paper with application of heat. The laser illuminates the drum through a transparent portion known as the ROS (raster output scanner) window. Printer 12 may also view printed documents through the ROS window with a scanner that electronically scans the printed document to recreate the printed document as an electronic document. ROS window cleaning guide housing 14 accepts a cleaning tool 18 that performs a unidirectional cleaning motions to clean the ROS window. A clean ROS window helps to achieve better quality prints and scans.

Figure 2:
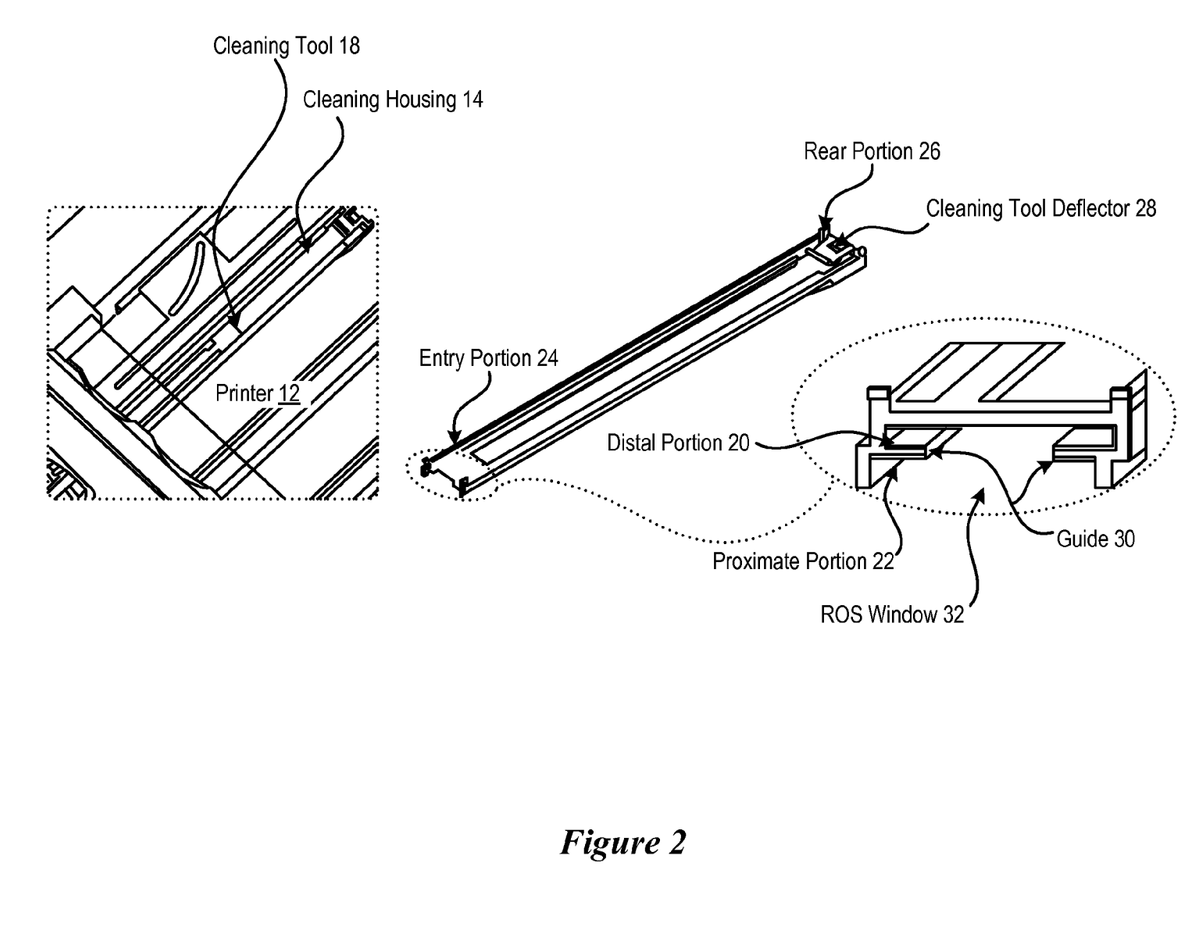
FIG. 2 depicts a cross sectional view of a ROS window cleaning guide housing passageway having distal and proximate portions.

Referring now to FIG. 2, a cross sectional view depicts a ROS window cleaning guide housing 14 that defines a passageway having a distal portion 20 and a proximate portion 22. ROS window cleaning guide housing 14 may be integrated into the housing of printer 12 or coupled into printer 12 as a separately manufactured piece. Cleaning tool 18 fits into the passageway defined by housing 14 to align with a desired cleaning motion of the ROS window. Cleaning guide housing 14 has an entry portion 24 into which cleaning tool 18 is inserted and a rear portion 26 at the end of the passageway. A cleaning tool deflector 28 at rear portion 26 accepts a cleaning tool inserted in distal portion 20 and automatically directs the cleaning tool from distal portion 20 into proximate portion 22. Opposing guides 30 extend into the passageway defined by housing 14 to engage protrusions extending from cleaning tool 18. During insertion of cleaning tool 18 at entry portion 24, the protrusions of cleaning tool 18 rest on distal portion 20 of guide 30 so that the cleaning tool remains distal and out of contact with ROS window 32. Once cleaning tool 18 reaches the rear portion 26 in the passageway of housing 14, cleaning tool deflector 28 adjusts the cleaning tool so that its protrusions interact with the proximate portion 22 of guide 30. Proximate portion 22 engages protrusions from cleaning tool 18 so that a cleaning portion of cleaning tool 18 remains in contact with ROS window 32.

Figure 3:
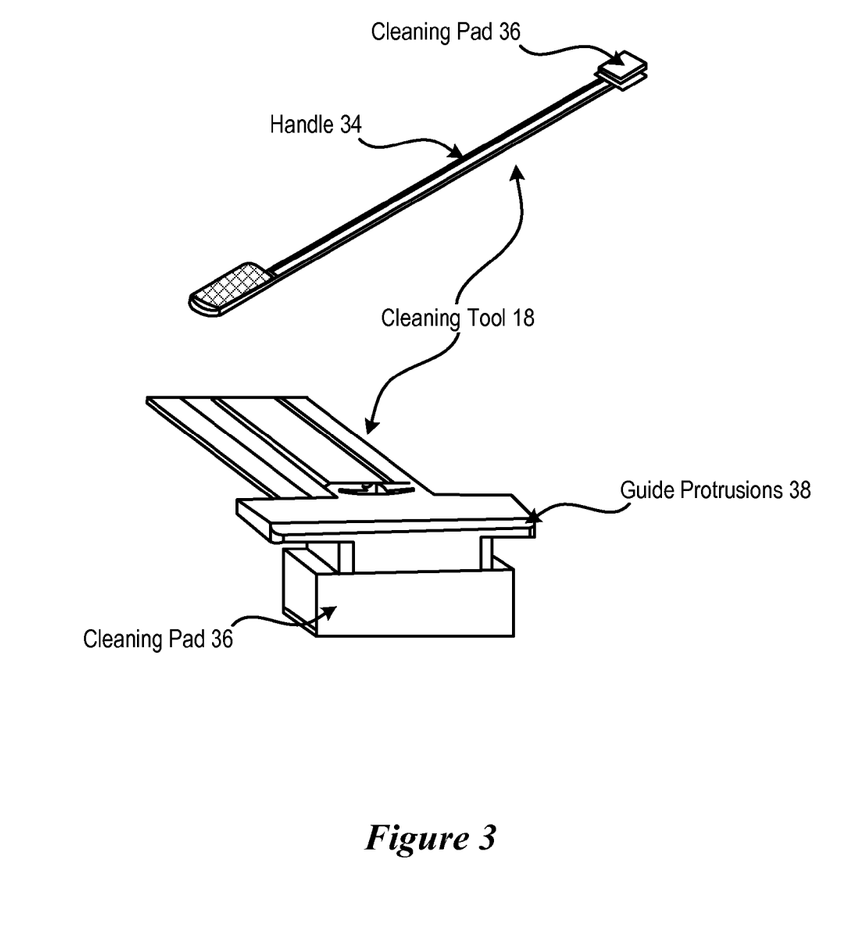
FIG. 3 depicts a blown-up view of a cleaning tool for cleaning a ROS window.

FIG. 3 depicts a blown-up view of a cleaning tool 18 for cleaning a ROS window. Cleaning tool 18 has a handle 18 of sufficient length to allow insertion of a cleaning pad 36 to the rear portion 26 of cleaning guide housing 14. Cleaning pad 36 is a removable and disposable cleaning material that cleans the transparent surface of ROS window 32. Alternatively, cleaning tool 18 has a permanently attached cleaning material so that the entire tool is disposable. Guide protrusions 38 extend outward for a length sufficient to engage guide 30 so that cleaning tool 18 will remain in either distal portion 20 or proximate portion 22 as cleaning tool 18 travels the length of cleaning guide housing 14.

Figure 4:
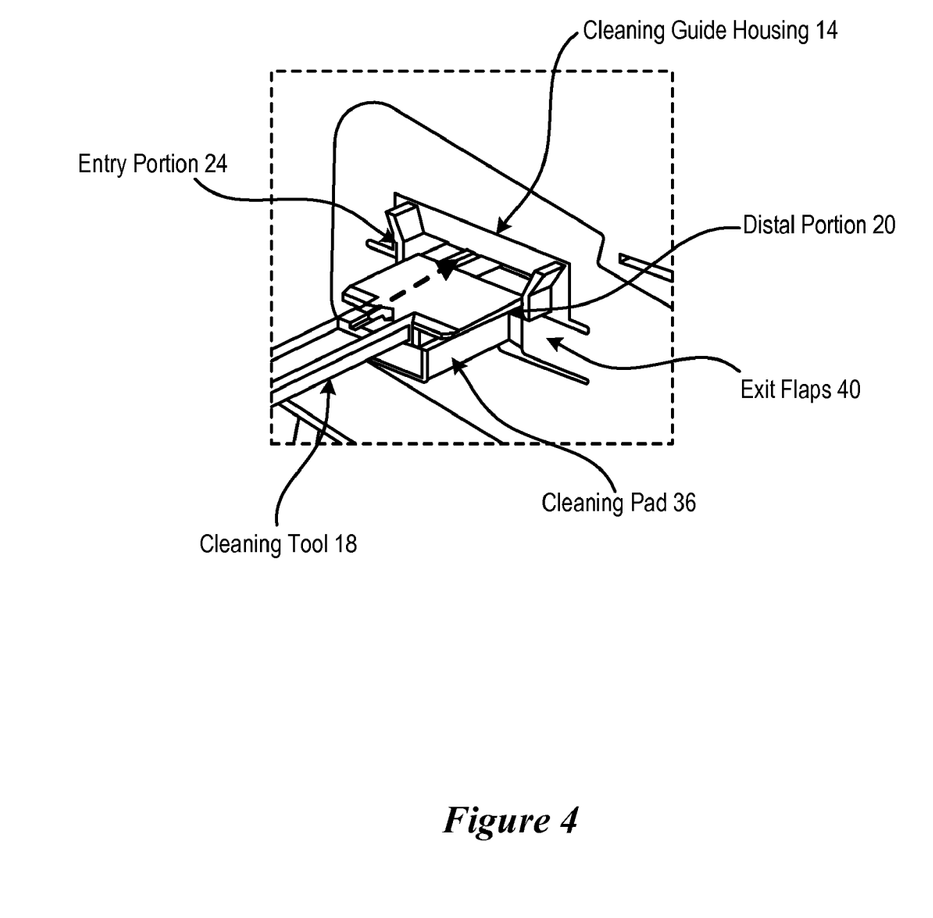
FIG. 4 depicts insertion of a cleaning tool in a ROS window cleaning guide housing passageway distal portion.
Figure 5:
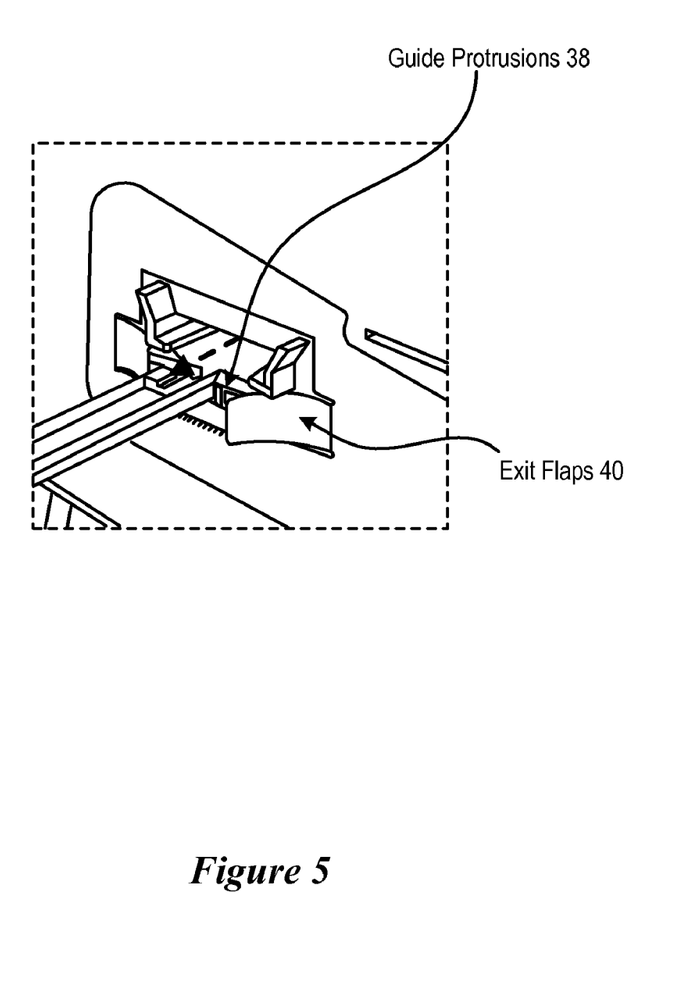
FIG. 5 depicts removal of a cleaning tool from a ROS window cleaning guide housing passageway proximate portion.

Referring now to FIG. 4, insertion of a cleaning tool 18 in a ROS window cleaning guide housing passageway 14 distal portion 20 is depicted. Entry portion 24 has an exit flaps 40 which prevents insertion of cleaning tool 18 in proximate portion 22 of cleaning guide housing 14. By directing entry of cleaning tool 18 into distal portion 20, cleaning pad 36 is kept out of contact with ROS window 32 through the insertion of cleaning pad 36 to rear portion 26. Interaction of cleaning tool 18 with cleaning tool deflector 28 at rear portion 26 moves cleaning tool 18 into proximate portion 22 so that cleaning pad 36 contacts ROS window 32 starting at rear portion 26 of cleaning guide housing 14. Removal of cleaning tool 18 from cleaning guide housing 14 causes cleaning pad 36 to clean ROS window 32 until exit of cleaning tool 18 from cleaning guide housing passageway 14. Referring now to FIG. 5, removal of a cleaning tool from a ROS window cleaning guide housing passageway proximate portion is depicted. Exit flaps 40 flexes or hinges open as guide protrusions 38 contact it so that cleaning tool 18 is removed from cleaning guide housing 14 while in proximate portion 22. Thus, cleaning of ROS window 32 is performed with a motion that brings contaminants out entry portion 24 rather than pushing contaminants to rear portion 26.

Figure 6:
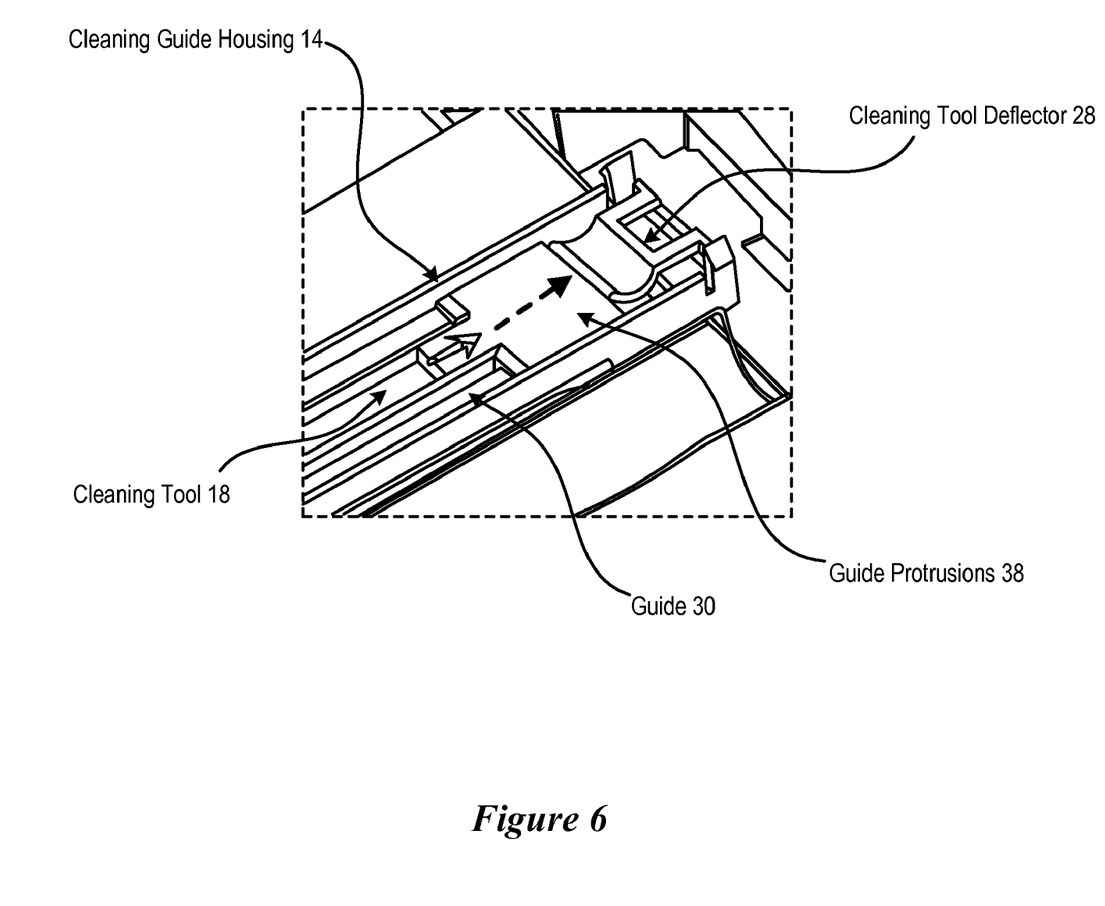
FIG. 6 depicts insertion of a cleaning tool to the rear of the ROS window cleaning guide housing passageway to interact with the cleaning tool deflector.
Figure 7:
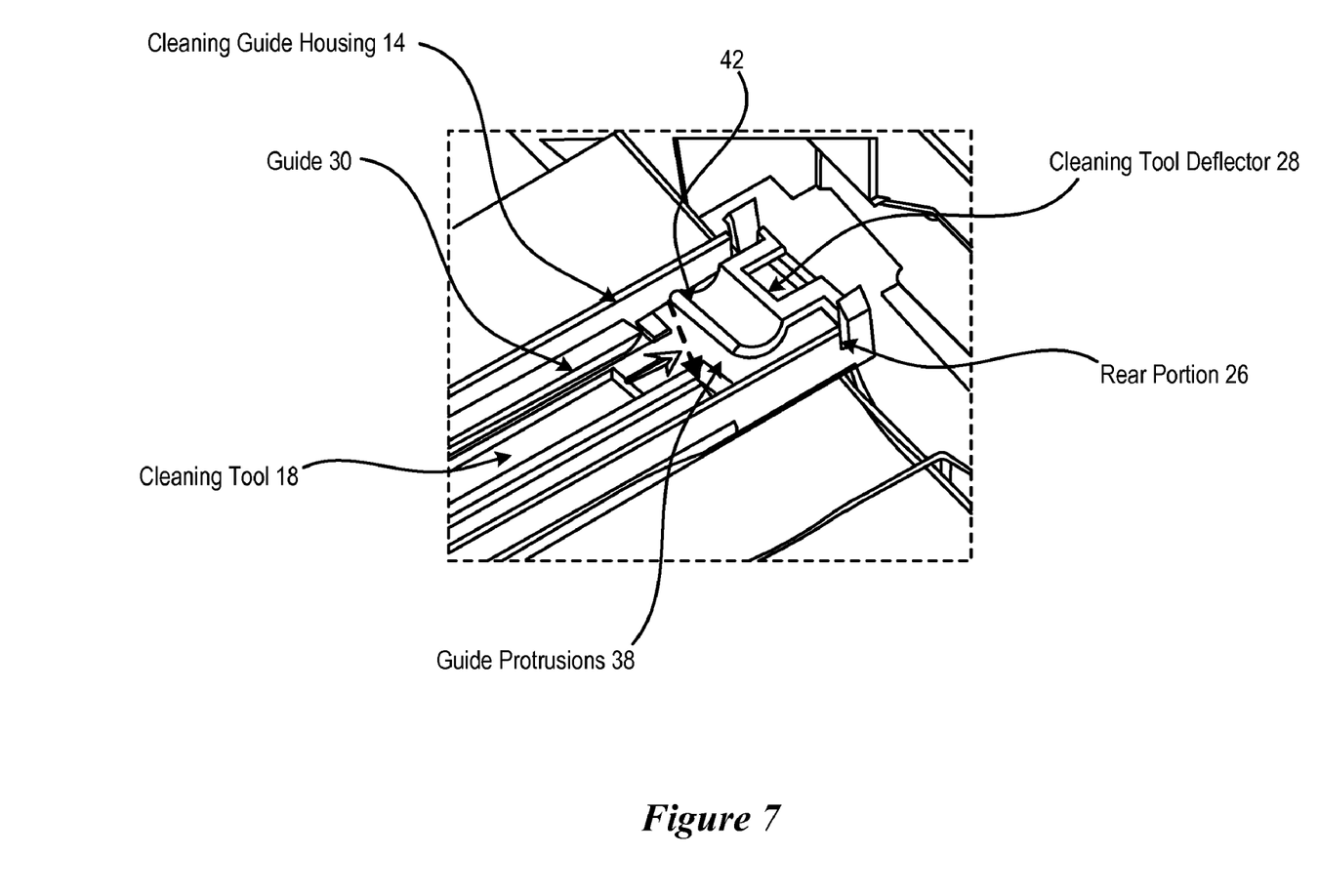
FIG. 7 depicts interaction of a cleaning tool with a cleaning tool deflector at the rear of the ROS window cleaning guide housing passageway.
Figure 8:
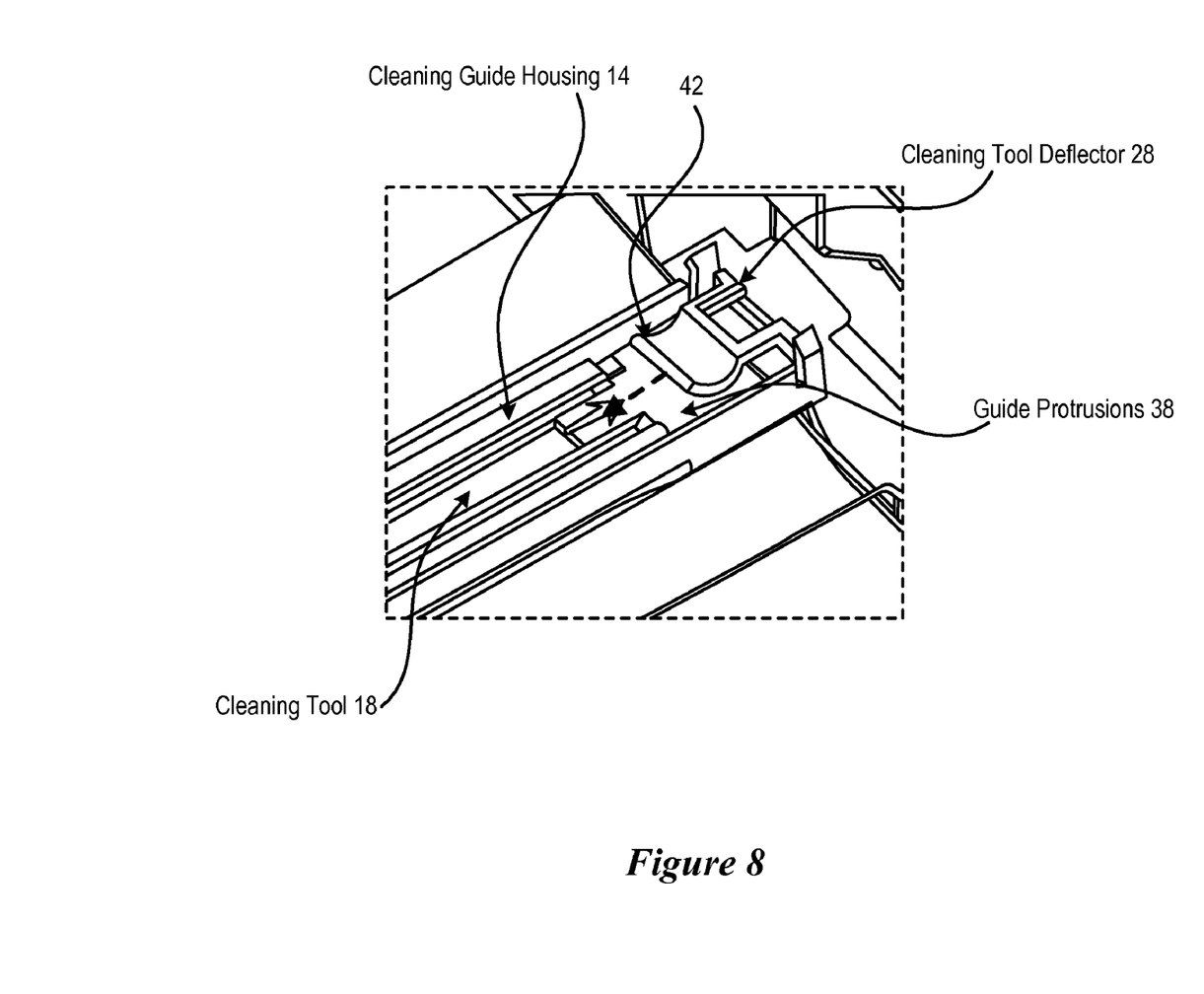
FIG. 8 depicts removal of a cleaning tool from the ROS window cleaning guide housing passageway.

Referring now to FIG. 6, insertion of a cleaning tool 18 to the rear of the ROS window cleaning guide housing passageway 14 to interact with the cleaning tool deflector 28 is depicted. Cleaning tool deflector 28 has adjusting lip 42 that catches cleaning tool 18 and pulls cleaning tool deflector 28 over cleaning tool 18 as cleaning tool 18 travels toward the rear portion 26 of cleaning guide housing passageway 14. Cleaning tool deflector 28 has a spring that biases downward against cleaning tool 18. Referring now to FIG. 7, interaction of cleaning tool 18 with a cleaning tool deflector 28 at the rear 26 of the ROS window cleaning guide housing passageway 14 is depicted. As cleaning tool 18 reaches rear portion 26, protrusions 38 pass the end of guides 30 so that bias provided from cleaning tool deflector 28 forces cleaning tool 18 into contact with ROS window 32. When cleaning tool 18 is forced proximate ROS window 32, guide protrusions 38 proceed from distal portion 20 of housing 14 into proximate portion 22. Inclined surfaces of guide protrusions 38 help to direct guide protrusions 38 underneath guides 30. Referring now to FIG. 8, removal of cleaning tool 18 from the ROS window cleaning guide housing passageway 14 is depicted. As cleaning tool 18 is pulled from rear portion 26 towards entry portion 24, guide protrusions 38 ride against guide 30 in proximate portion 22 so that cleaning pad 36 presses against the transparent surface of ROS window 32 to wipe contaminants out of passageway 14 towards entry portion 24.

Figure 9:
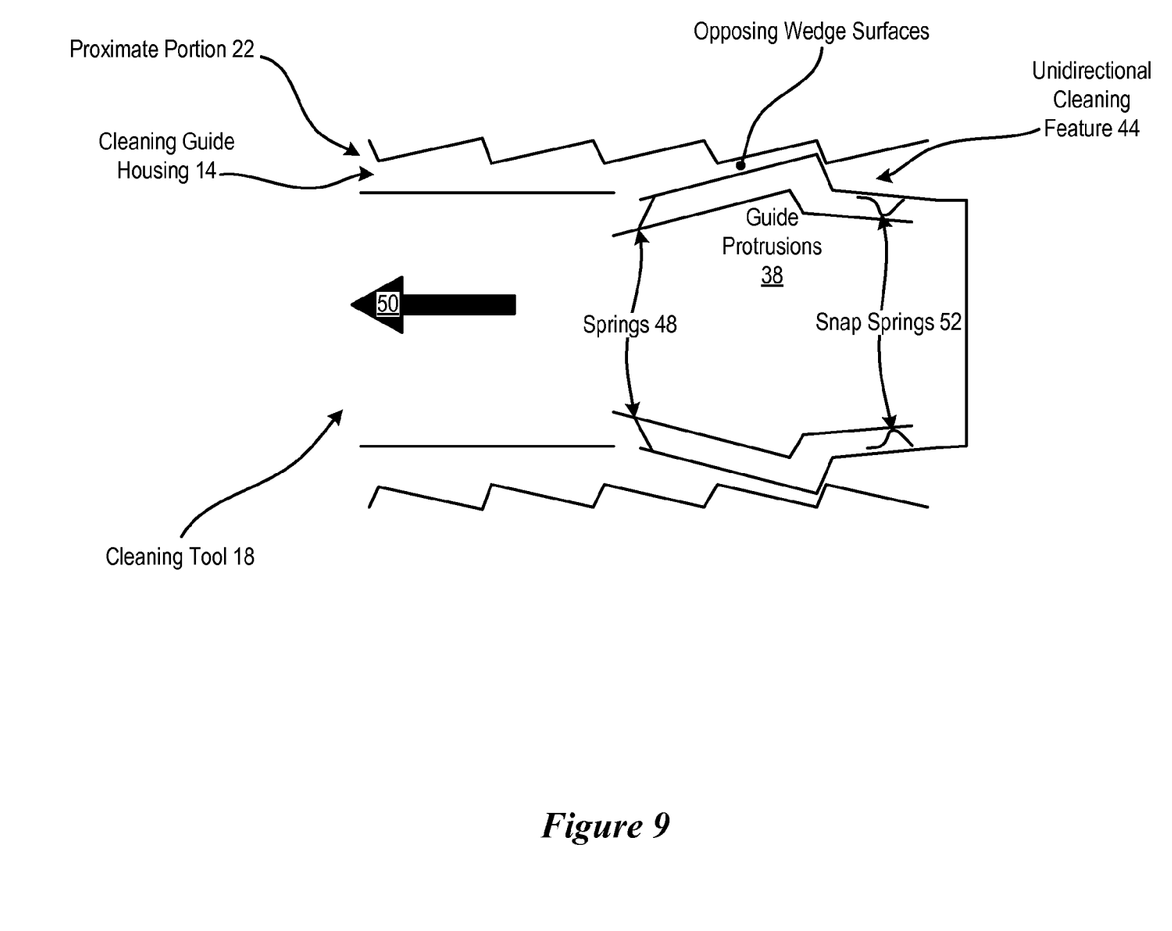
FIG. 9 depicts a unidirectional feature that prevents insertion of a cleaning tool in the ROS window cleaning guide housing passageway proximate portion.

FIG. 9 depicts a unidirectional feature 44 that prevents insertion of a cleaning tool 18 in the ROS window cleaning guide housing passageway 14 proximate portion 22. Unidirectional cleaning feature 44 has opposing wedged surfaces between proximate portion 22 and cleaning tool 18 guide protrusions. Springs 48 bias wedge shapes of guide protrusions 38 against wedge shapes formed in proximate 22. As cleaning tool 18 is removed from passageway 14 in the direction of arrow 50, the opposing wedge surfaces give way relative to each other to allow free movement of cleaning tool 18. If cleaning tool 18 is inserted in passageway 14 springs 48 cause opposing wedge surfaces 46 to engage to prevent movement in the opposite direction of arrow 50. Snap springs 52 create a snap sound during removal of cleaning tool 18 to provide feedback to an end user during removal of cleaning tool 18.

Although the present invention has been described in detail, it should be understood that various changes, substitutions and alterations can be made hereto without departing from the spirit and scope of the invention as defined by the appended claims.

What is claimed is:

1. An information handling system peripheral comprising:
   a housing;
   components disposed in the housing and operable to perform a peripheral function;
   a transparent portion disposed in the housing;
   a cleaning passageway formed in the housing proximate the transparent portion, the cleaning passageway having an entry portion, a rear portion, and a guide, the guide having a distal portion and a proximate portion;
   a cleaning tool deflector proximate the rear portion, the cleaning tool deflector operable to accept a cleaning device inserted at the entry portion and passed in the distal portion to the rear portion and to redirect the cleaning device to the proximate portion for removal from the cleaning passageway through the entry portion, the proximate portion maintaining the cleaning device in contact with transparent portion during the removal; and
   one or more exit flaps associated with the entry portion and operable to allow insertion of the cleaning device in the distal portion, to restrict insertion of the cleaning device in the proximate portion, and to allow removal of the cleaning device at the entry portion from the proximate portion.

2. The information handling system peripheral of claim 1 wherein the cleaning passageway distal portion maintains the cleaning device out of contact with the transparent portion while the cleaning device passes from the entry portion to the rear portion.

3. The information handling system peripheral of claim 2 further comprising a unidirectional feature operable to interact with the cleaning device in the proximate portion to preclude motion of the cleaning device towards the rear portion.

4. The information handling system peripheral of claim 3 further comprising a cleaning device having an arm of a length sufficient to extend from the rear portion out the entry portion and having protrusions operable to interact with the guide.

5. The information handling system peripheral of claim 4 wherein the cleaning tool deflector comprises a biasing mechanism aligned to bias the cleaning device from the distal portion to the proximate portion at the rear portion.

6. The information handling system peripheral of claim 1 wherein the components comprise printer components and the transparent portion comprises a ROS window.

7. The information handling system of claim 1 wherein the components comprise scanning components and the transparent portion comprises a window separating the scanning components from an object for scanning.

8. A method for cleaning a transparent portion of an electronic device, the method comprising:
   inserting a cleaning tool into a distal portion of a cleaning passageway of the device;
   maintaining a cleaning portion of the cleaning tool distal the transparent portion until the cleaning portion approaches a rear portion of the passageway;
   automatically adjusting the cleaning portion from the distal portion of the cleaning passageway to a proximate portion of the cleaning passageway, the proximate portion proximate the transparent portion at the rear portion of the cleaning passageway;
   removing the cleaning tool from the cleaning passageway;
   maintaining the cleaning portion proximate the transparent portion to clean the transparent portion during the removing; and
   preventing re-insertion of the cleaning tool through the proximate portion of the cleaning passageway during removal of the cleaning tool.

9. The method of claim 8 wherein inserting a cleaning tool further comprises:
   inserting the cleaning tool at a distal portion of a guide formed in the passageway; and
   blocking entry of the cleaning tool at a proximate portion of the guide.

10. The method of claim 9 wherein maintaining a cleaning portion further comprises guiding the cleaning tool along the distal portion to the rear portion of the cleaning passageway.

11. The method of claim 8 wherein automatically adjusting the cleaning portion further comprises engaging the cleaning tool with a biasing mechanism that biases the cleaning portion into a proximate portion of the guide.

12. The method of claim 8 wherein preventing re-insertion of the cleaning tool further comprises engaging flexible members in formations of the proximate portion upon re-insertion.

13. The method of claim 12 further comprising snapping the flexible members against the formations during removal of the cleaning tool.

14. The method of claim 8 wherein the transparent portion comprises a ROS window of a laser printer.

15. A system for cleaning a printer transparent surface, the system comprising:
- a housing forming a passageway along the transparent surface, the housing having an entry, a rear and a guide, the guide having a distal portion and a proximate portion;
- a cleaning tool having a handle and a cleaning portion, the cleaning portion sized to engage the guide;
- one or more exit flaps associated with the housing entry and operable to direct the cleaning tool into the guide distal portion; and
- a cleaning tool deflector proximate the housing rear and operable to bias the cleaning tool from the distal portion to the proximate portion upon insertion of the cleaning tool cleaning portion to the housing rear so that the cleaning portion touches the transparent surface.

16. The system of claim 15 wherein the transparent surface comprises a ROS window.

17. The system of claim 15 further comprising a unidirectional cleaning feature operable to interact with the cleaning tool in the proximate portion to preclude motion of the cleaning tool towards the housing rear.

18. The system of claim 17 wherein the unidirectional cleaning feature comprises flexible members associated with the cleaning tool and formations associated with the proximate portion, the flexible members engaging the formations upon insertion of the cleaning tool towards the housing rear.

* * * * *